US012639989B2

(12) United States Patent
Wang et al.

(10) Patent No.: US 12,639,989 B2
(45) Date of Patent: May 26, 2026

(54) SYSTEMS AND METHODS FOR SELECTING A NEGOTIATION PROTOCOL FOR CONNECTED VEHICLES

(71) Applicant: Toyota Motor Engineering & Manufacturing North America, Inc., Plano, TX (US)

(72) Inventors: Hao M. Wang, Mountain View, CA (US); Sergei S. Avedisov, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 166 days.

(21) Appl. No.: 18/368,697

(22) Filed: Sep. 15, 2023

(65) Prior Publication Data

US 2025/0095410 A1 Mar. 20, 2025

(51) Int. Cl.
*G07C 5/00* (2006.01)

(52) U.S. Cl.
CPC .................................... *G07C 5/008* (2013.01)

(58) Field of Classification Search
CPC ...................................................... G07C 5/008
USPC ......................................................... 701/31.4
See application file for complete search history.

(56) References Cited

U.S. PATENT DOCUMENTS

2004/0193374 A1* 9/2004 Hac ........................ G08G 1/166 701/301
2011/0190972 A1* 8/2011 Timmons ............... G08G 1/167 701/31.4
2017/0158175 A1* 6/2017 Fairfield .............. G05D 1/0088
2018/0011494 A1* 1/2018 Zhu ....................... B60W 30/18
2019/0243381 A1* 8/2019 Strunck ............ G08G 1/096791
2021/0385630 A1* 12/2021 Yang ....................... H04W 4/12
2022/0089164 A1* 3/2022 Wang .............. B60W 30/18163
2022/0227367 A1* 7/2022 Kario ................... G06V 40/103
2022/0340177 A1* 10/2022 Khayatian ....... B60W 30/18154
2023/0303069 A1* 9/2023 Fukui ................ B60W 30/0956

FOREIGN PATENT DOCUMENTS

DE 102013111305 A1 4/2015
DE 102018001324 A1 8/2019
DE 102019219435 A1 6/2021

OTHER PUBLICATIONS

Opportunistic strategy for cooperative maneuvering using conflict analysis (https://www.researchgate.net/publication/355837613_Opportunistic_Strategy_for_Cooperative_Maneuvering_Using_Conflict_Analysis), Jul. 2021.

(Continued)

*Primary Examiner* — Tyler D Paige
(74) *Attorney, Agent, or Firm* — Dinsmore & Shohl LLP

(57) ABSTRACT

An ego vehicle includes a controller configured to determine a degree of conflict in a conflict zone between the ego vehicle and a remote vehicle based on a position and a velocity of the ego vehicle, and driving information of the remote vehicle, select a negotiation protocol based on the degree of conflict, initiate a negotiation with the remote vehicle based on the selected negotiation protocol, and operate the ego vehicle based on the negotiation.

20 Claims, 11 Drawing Sheets

(56) References Cited

OTHER PUBLICATIONS

Multi-vehicle conflict management with status and intent sharing under time delays (https://ieeexplore.ieee.org/ document/9998111), Dec. 23, 2022.
H. M. Wang, S. S. Avedisov, T. G. Molnár, A. H. Sakr, O. Altintas, and G. Orosz, "Conflict analysis for cooperative maneuvering with status and intent sharing via V2X communication," in IEEE Transactions on Intelligent Vehicles, vol. 8, No. 2, pp. 1105-1118, 2023.
R. Molina Masegosa, S. S. Avedisov, M. Sepulcre, Y. Z. Farid, J. Gozalvez, O. Altintas, "V2X Message Generation Rules for Maneuver Coordination in Connected Automated Driving", IEEE Vehicular Technology Magazine, pp. 1-8, 2023.
SAE International, Surface Vehicle Standard, "Application Protocol and Requirements for Maneuver Sharing and Coordinating Service", pp. 1-59, 2016.

* cited by examiner

SYSTEMS AND METHODS FOR SELECTING A NEGOTIATION PROTOCOL FOR CONNECTED VEHICLES

TECHNICAL FIELD

The present disclosure relates to systems and methods for selecting a negotiation protocol for connected vehicles.

BACKGROUND

Negotiation is a type of cooperative maneuvering that allows vehicles to coordinate complex maneuvers together. Such vehicles may be able to perform complex maneuvers such as platooning, merging, lane changing, or intersection crossing simultaneously, in a way that allows them to work towards a common goal. Negotiation may bring benefits in scenarios where vehicles may not cooperate.

However, conventional systems and methods may not specify when vehicles initiate a negotiation protocol. Moreover, conventional systems and methods may not specify criteria to determine which type of negotiation protocol should be followed. Since the negotiation involves remote vehicles exchanging multiple messages before initiating the cooperative maneuver, it is desired to determine an appropriate time to initiate a negotiation request, and the appropriate negotiation protocol.

Accordingly, a need exists for systems and methods that select a negotiation protocol among a plurality of negotiation requests to provide effective implementation of agreement seeking cooperation using maneuver messages.

SUMMARY

The present disclosure provides systems and methods for selecting a negotiation protocol based on a degree of conflict in a conflict zone. With a determination of degrees of conflict in the conflict zone, the systems and methods select a negotiation protocol and initiate a negotiation request within an appropriate time, thereby avoiding an undesirable situation.

In one or more embodiments, an ego vehicle includes a controller configured to a controller configured to: determine a degree of conflict in a conflict zone between the ego vehicle and a remote vehicle based on a position and a velocity of the ego vehicle, and driving information of the remote vehicle, select a negotiation protocol based on the degree of conflict, initiate a negotiation with the remote vehicle based on the selected negotiation protocol, and operate the ego vehicle based on the negotiation.

In another embodiment, a method for selecting a negotiation protocol includes determining a degree of conflict in a conflict zone between the ego vehicle and a remote vehicle based on a position and a velocity of the ego vehicle, and driving information of the remote vehicle, selecting a negotiation protocol based on the degree of conflict, initiating a negotiation with the remote vehicle based on the selected negotiation protocol, and operating the ego vehicle based on the negotiation.

These and additional features provided by the embodiments of the present disclosure will be more fully understood in view of the following detailed description, in conjunction with the drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Figure 1A:
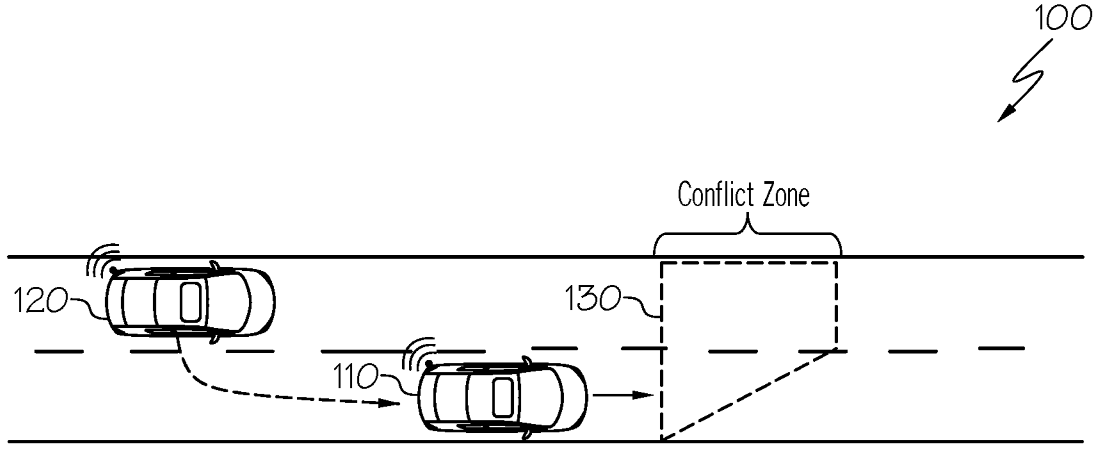
FIGS. 1A-1C schematically depict an exemplary embodiment of selecting a negotiation protocol for connected vehicles including lane exchanges on a road, according to one or more embodiments shown and described herein.

The embodiments disclosed herein include systems and methods for selecting a negotiation protocol based on a degree of conflict in a conflict zone. With a determination of degrees of conflict in the conflict zone, the systems and methods select a negotiation protocol and initiate a negotiation request within an appropriate time, thereby avoiding an undesirable situation.

As used herein, the term "Basic Safety Message (BSM)" may refer to a wireless message transmitted between vehicles where the transmitter sends its position, speed and other static or dynamic information. This type of message may be standardized by Society of Automotive Engineers (SAE).

As used herein, the term "Maneuver Message (MM)" may refer to a general class of wireless messages exchanged between road users, such as the ego vehicle, and infrastructure that contains the future trajectory or possible future trajectories) of the transmitting road user. Specific examples of such messages could be the Maneuver Coordination Message (MCM) undergoing standardization by European Telecommunications Standards Institute (ETSI) or the Maneuver Sharing Coordination Message (MSCM) currently being standardized by SAE.

As used herein, the term "Sensor Data Message (SDM)" may refer to a general class of wireless messages exchanged among road users, and between road users and infrastructure. Each SDM may contain information about detected objects (class of object, position of object, speed of object, size of object). Specific examples of such messages could be the Collective Perception Message (CPM) undergoing standardization by ETSI and the Sensor Data Sharing Message (SDSM) currently being standardized by SAE.

As used herein, the term "the basic negotiation protocol" may be standardized by SAE. The basic negotiation protocol may include awareness state, maneuver negotiation state, and maneuver execution state. At the awareness state, a maneuver negotiation session is opened. At the maneuver negotiation state, it is determined whether the maneuver request is granted, the negotiation is canceled, or the message rule is met. When it is determined that the maneuver request is denied, the negotiation is canceled or the message rule is not met, the status of the protocol goes back to the awareness state. When it is determined that the maneuver request is granted, the negotiation is not canceled, or the message rule is met, the status of the protocol is proceeded to the maneuver execution state. At the maneuver execution state, the maneuver execution is completed.

As used herein, the term "the emergency negotiation protocol" may be standardized by SAE. The emergency negotiation protocol may include awareness state, maneuver announcement state, and maneuver execution state. At the awareness state, a maneuver negotiation session is opened. At the maneuver announcement state, it is determined whether the maneuver reservation is canceled. The term "maneuver reservation" may refer to a maneuver message that specifies a particular section of road will be reserved, rather than a request. When it is determined that the maneuver reservation is canceled, the status of the protocol goes back to the awareness state. When it is determined that the maneuver reservation is not canceled, the status of the protocol is proceeded to the maneuver execution state. At the maneuver execution state, the maneuver execution is completed.

Figure 1B:
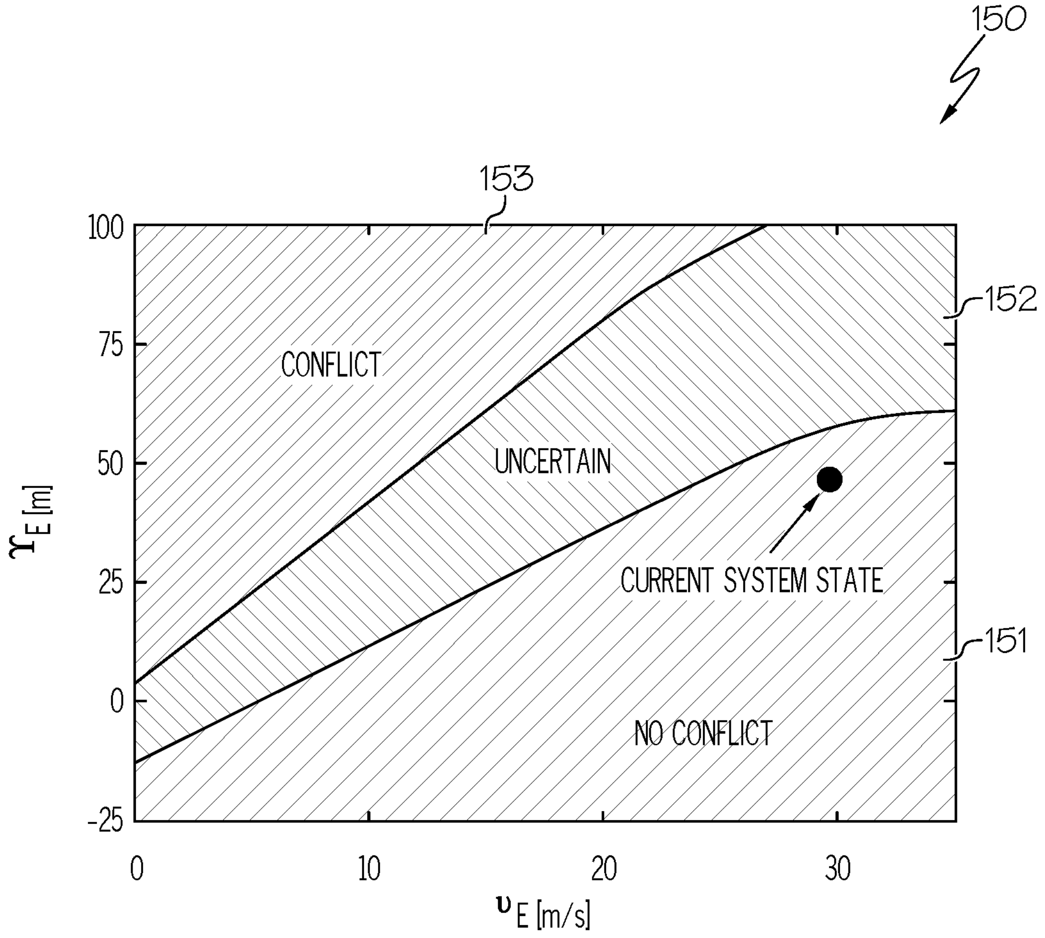
Figure 1C:
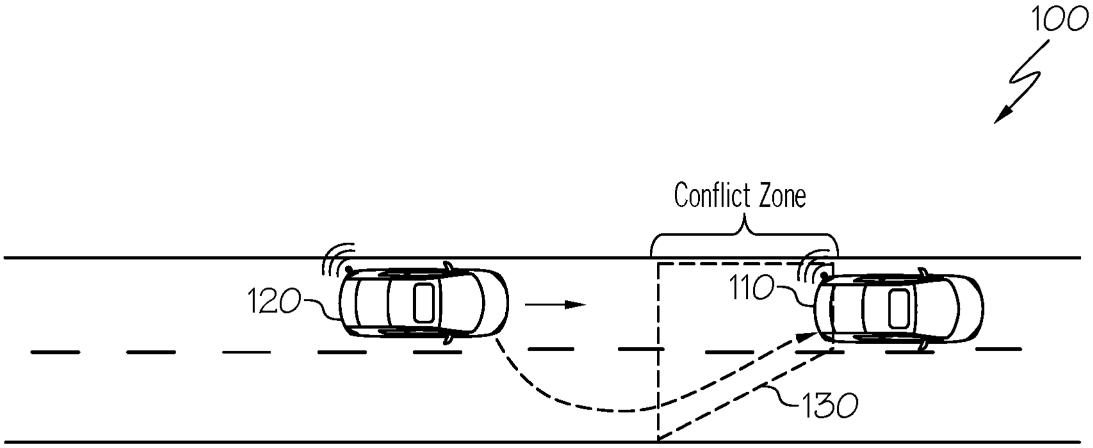

FIGS. 1A-1C schematically depict an exemplary embodiment of selecting a negotiation protocol for connected vehicles including lane exchanges on a road, according to one or more embodiments shown and described herein.

Referring to FIG. 1A, the ego vehicle 110 and the remote vehicle 120 may be on a road having at least two-lane. A conflict zone 130 may exist in the front of the ego vehicle 110 and the remote vehicle 120. The conflict zone 130 is a zone where a conflict may exist between the ego vehicle 110 and the remote vehicle 120 when the ego vehicle 110 merges into the lane in which the remote vehicle 120 is driving. The distance between the ego vehicle 110 and the conflict zone 130 is closer than the distance between the remote vehicle 120 and the conflict zone 130. The ego vehicle 110 may be in the right lane of the two-lane road. The remote vehicle 120 may be in the left lane of the two-lane road.

The ego vehicle 110, the remote vehicle 120, or both, may be a vehicle including an automobile or any other passenger or non-passenger vehicle such as, for example, a terrestrial, aquatic, and/or airborne vehicle. In some embodiments, the ego vehicle 110, the remote vehicle 120, or both, may be an autonomous driving vehicle. For example, the ego vehicle 110, the remote vehicle 120, or both, may be vehicles with SAE level 3 or more autonomy. The ego vehicle 110, the remote vehicle 120, or both, may be an autonomous vehicle that navigates its environment with limited human input or without human input. The ego vehicle 110, the remote vehicle 120, or both, may be equipped with internet access and share data with other devices both inside and outside the ego vehicle 110, the remote vehicle 120, or both. The ego vehicle 110, the remote vehicle 120, or both may communicate with the server 240 (shown in FIG. 2) and transmit its data to the server 240 (shown in FIG. 2). For example, the ego vehicle 110, the remote vehicle 120, or both, transmits information about its current location and destination, its environment, information about a current driver, information about a task that it is currently implementing, and the like. The ego vehicle 110, the remote vehicle 120, or both, may include an actuator configured to move the ego vehicle 110, the remote vehicle 120, or both.

Referring to FIG. 1A, the ego vehicle 110 is planning to merge ahead of the remote vehicle 120. The remote vehicle 120 is approaching from an on-ramp. A conflict zone 130 is defined near the end of the ramp, where the ego vehicle 110 and the remote vehicle 120 should not appear inside at the same time to avoid undesired situation, such as collision.

Referring to FIG. 1B, the ego vehicle 110 determines a degree of conflict in a conflict zone 130. The ego vehicle 110 determines a degree of conflict in a conflict zone 130 based on a position and a velocity of the ego vehicle 110, expected velocity/accelerations of the ego vehicle 110 for the following few seconds, and driving information of the remote vehicle 120. The driving information of the remote vehicle 120 may include a position of the remote vehicle 120, the velocity of the remote vehicle 120, the acceleration of the remote vehicle 120, expected velocity/accelerations of the remote vehicle 120 for the following few seconds, maneuver of the remote vehicle 120, or combinations thereof.

The ego vehicle 110 may be a negotiation initiator. The ego vehicle 110 may receive a sensor data through one or more sensors 218 (shown in FIG. 2). The sensor data may include the information related to objects around the ego vehicle 110. For example, the sensor data may include boundaries of geometry, corners of geometry, boundaries of signs, corners of signs, boundaries of roadway, corners of roadway, boundaries of obstacles, corners of obstacles, or combinations thereof. The ego vehicle 110 may further receive Basic Safety Message, Maneuver Message, Sensor Data Message, or combinations thereof, from surrounding remote vehicles including the remote vehicle 120.

The ego vehicle 110 may receive the driving information of the remote vehicle 120 from the remote vehicle 120, the server 240 (shown in FIG. 2), or both. The driving information of the remote vehicle 120 may include a velocity of the remote vehicle 120, an acceleration of the remote vehicle 120, a position of the remote vehicle 120, a direction that the remote vehicle 120 is driving, an intended direction that the remote vehicle 120 is driving within a predetermined time period, or combinations thereof. Based on a position and a velocity of the ego vehicle 110, expected velocity/accelerations of the ego vehicle 110 for the following few seconds, and driving information of the remote vehicle 120, the ego vehicle 110 may generate a conflict chart 150 and determine the degree of conflict based on a position of a state of the ego vehicle in a conflict chart 150.

The conflict chart 150 may comprise a no-conflict domain 151, an uncertain domain 152, and a conflict domain 153 as shown in FIG. 1B. The conflict domain 153 may be defined as a domain where there is greater than or equal to a first percentage (e.g., 90 percent (%)) of the possibility of conflict between the ego vehicle 110 and the remote vehicle 120 when the ego vehicle 110 performs the maneuver, such as platooning, merging, lane changing, intersection crossing simultaneously. In the conflict domain 153, the maneuver from the ego vehicle 110 may be almost impossible to cooperate on. The no-conflict domain 151 may be defined as a domain where there is less than or equal to a second percentage (e.g., 10%) of the possibility of conflict between the ego vehicle 110 and the remote vehicle 120 when the ego vehicle 110 performs the maneuver, such as platooning, merging, lane changing, intersection crossing simultaneously. In the no-conflict domain 151, little or no action of the ego vehicle 110, the remote vehicle 120, or both, compared to the uncertain domain 152, is required to cooperate the maneuver from the ego vehicle 110. The uncertain domain 152 may be defined as a domain where there is a greater than the second percentage (e.g., 10%) and less than the first percentage (e.g., 90%) of the possibility of conflict between the ego vehicle 110 and the remote vehicle 120 when the ego vehicle 110 performs the maneuver, such as platooning, merging, lane changing, intersection crossing simultaneously. In the uncertain domain 152, significant action of the ego vehicle 110, the remote vehicle 120, or both, compared to the no-conflict domain 151, is required to cooperate the maneuver from the ego vehicle 110. In the conflict chart 150, $r_E$ refers to the position of the ego vehicle 110, and $v_E$ refers to the velocity of the ego vehicle 110. The position of the ego vehicle 110 may refer to a distance, for example, the shortest distance, from the conflict zone 130 to the ego vehicle 110.

Still referring to FIG. 1B, the ego vehicle 110 may determine the position of the state of the ego vehicle 110 is in the no conflict domain 153 based on the position and the velocity of the ego vehicle 110, and driving information of the remote vehicle 120. The position of the state of the ego vehicle 110 in the no conflict domain 153 may indicate that independent motion of the remote vehicle 120 under the maneuver from the remote vehicle 120, a conflict between the ego vehicle 110 and the remote vehicle 120 may not happen when the remote vehicle 120 maintains the current driving information, such as, the lane, the velocity, or both.

Referring to FIG. 1C, in response to determining that the position of the state of the ego vehicle 110 is in the no conflict domain 153, the ego vehicle 110 may hold selecting a negotiation protocol. In response to determining that the position of the state of the ego vehicle 110 is in the no conflict domain 153, the ego vehicle 110 may further hold initiating the negotiation with the remote vehicle 120. Without selecting a negotiation protocol and initiating the negotiation, the ego vehicle 110 may merge ahead of the remote vehicle 120, while the remote vehicle 120 keeps driving in the same lane and without significantly changing the velocity, the acceleration, or the direction, or combinations thereof. The ego vehicle 110 may merge ahead of the remote vehicle 120 solely relying on a position and a velocity of the ego vehicle 110 and the driving information of the remote vehicle 120, without an undesired situation. Selecting a negotiation protocol in different scenarios will be described below with reference to FIGS. 3A through 5C.

Figure 2:
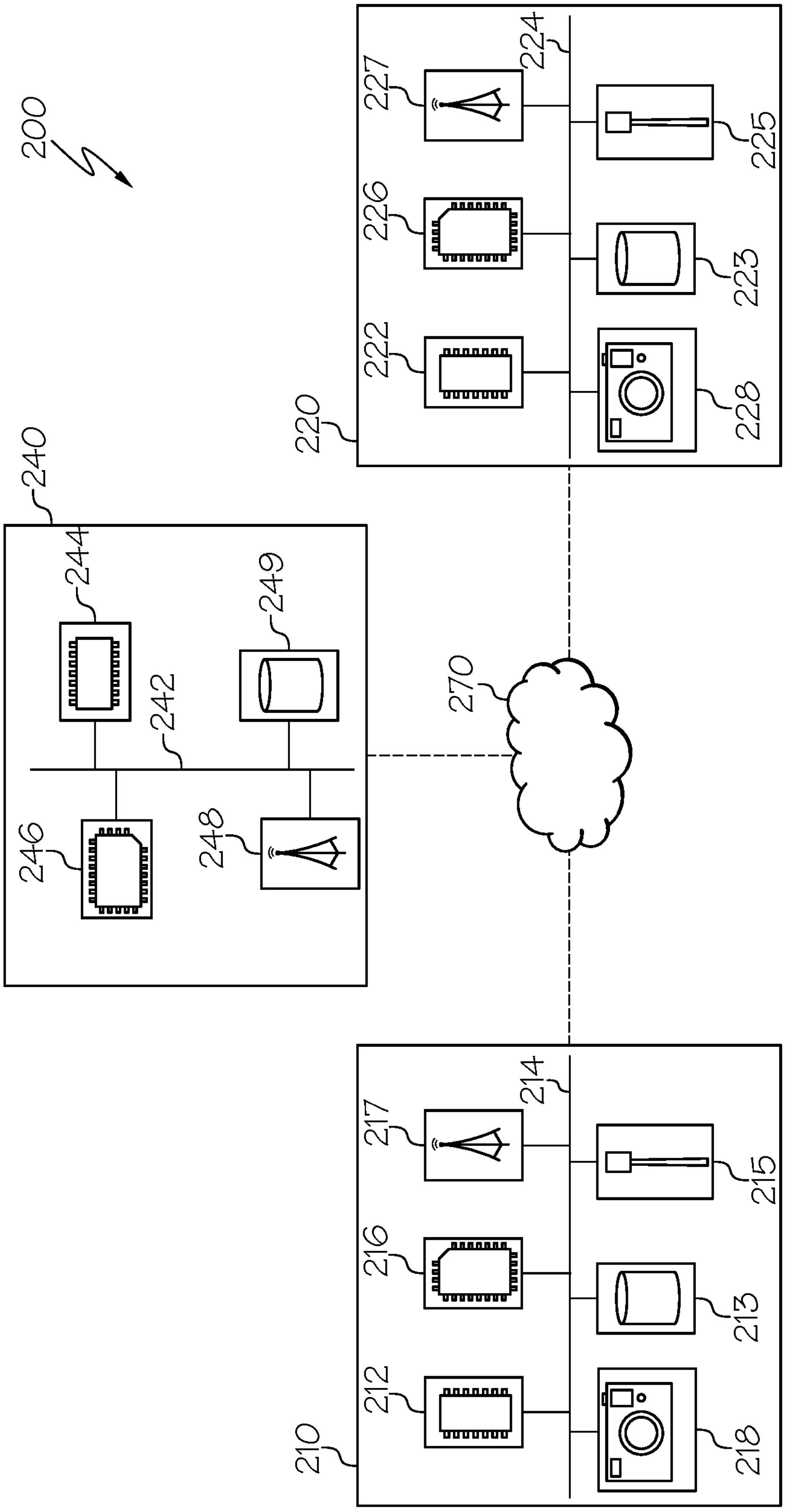
FIG. 2 depicts a schematic diagram of a system for selecting a negotiation protocol for connected vehicles, according to one or more embodiments shown and described herein.

FIG. 2 depicts a schematic diagram of a system for selecting a negotiation protocol for connected vehicles, according to one or more embodiments shown and described herein.

Referring to FIG. 2, the system 200 includes an ego vehicle system 210, a remote vehicle system 220, and the server 240.

The ego vehicle system 210 includes one or more processors 212. Each of the one or more processors 212 may be any device capable of executing machine-readable and executable instructions. Each of the one or more processors 212 may be a controller, an integrated circuit, a microchip, a computer, or any other computing device. One or more processors 212 are coupled to a communication path 214 that provides signal interconnectivity between various modules of the system. The communication path 214 may communicatively couple any number of processors 212 with one another, and allow the modules coupled to the communication path 214 to operate in a distributed computing environment. Each of the modules may operate as a node that may send and/or receive data. As used herein, the term ‖communicatively coupled‖ means that coupled components are capable of exchanging data signals with one another such as electrical signals via a conductive medium, electromagnetic signals via air, optical signals via optical waveguides, and the like.

The communication path 214 may be formed from any medium that is capable of transmitting a signal such as conductive wires, conductive traces, optical waveguides, or the like. In some embodiments, the communication path 214 may facilitate the transmission of wireless signals, such as WiFi, Bluetooth®, Near Field Communication (NFC), and the like. The communication path 214 may be formed from a combination of mediums capable of transmitting signals. In one embodiment, the communication path 214 comprises a combination of conductive traces, conductive wires, connectors, and buses that cooperate to permit the transmission of electrical data signals to components such as processors, memories, sensors, input devices, output devices, and communication devices. The communication path 214 may comprise a vehicle bus, such as a LIN bus, a CAN bus, a VAN bus, and the like. Additionally, it is noted that the term ▯signal▯ means a waveform (e.g., electrical, optical, magnetic, mechanical, or electromagnetic), such as DC, AC, sinusoidal-wave, triangular-wave, square-wave, vibration, and the like, capable of traveling through a medium.

The ego vehicle system 210 includes one or more memory modules 216 coupled to the communication path 214 and may contain non-transitory computer-readable medium comprising RAM, ROM, flash memories, hard drives, or any device capable of storing machine-readable and executable instructions such that the machine-readable and executable instructions can be accessed by the one or more processors 212. The machine-readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable and executable instructions and stored in the one or more memory modules 216. The machine-readable and executable instructions may be written in a hardware description language (HDL), such as logic implemented via either a field-programmable gate array (FPGA) configuration or an application-specific integrated circuit (ASIC), or their equivalents. The methods described herein may be implemented in any conventional computer programming language, as pre-programmed hardware elements, or as a combination of hardware and software components. The one or more processors 212 along with the one or more memory modules 216 may operate as a controller for the ego vehicle system 210.

The one or more memory modules 216 store instructions, when executed by the one or more processors 212, that cause the one or more processors 212 to determine a degree of conflict in a conflict zone 130 (shown in FIG. 1A) between the ego vehicle 110 (shown in FIG. 1A) and the remote vehicle 120 (shown in FIG. 1A) based on a position and a velocity of the ego vehicle 110 (shown in FIG. 1A), and driving information of the remote vehicle 120 (shown in FIG. 1A), select a negotiation protocol based on the degree of conflict, initiate a negotiation with the remote vehicle 120 (shown in FIG. 1A) based on the selected negotiation protocol, and operate the ego vehicle 110 (shown in FIG. 1A) based on the negotiation.

Still referring to FIG. 2, the ego vehicle system 210 includes one or more sensors 218. One or more sensors 218 may be any device having an array of sensing devices capable of detecting radiation in an ultraviolet wavelength band, a visible light wavelength band, or an infrared wavelength band. One or more sensors 218 may detect the presence of the ego vehicle system 210, the presence of the remote vehicle system 220, the location of the ego vehicle system 210, the location of the remote vehicle system 220, the distance between the ego vehicle system 210 and the remote vehicle system 220. One or more sensors 218 may have any resolution. In some embodiments, one or more optical components, such as a mirror, fish-eye lens, or any other type of lens may be optically coupled to one or more sensors 218. In some embodiments, one or more sensors 218 may provide image data to one or more processors 212 or another component communicatively coupled to the communication path 214. In some embodiments, one or more sensors 218 may provide navigation support. In embodiments, data captured by one or more sensors 218 may be used to autonomously or semi-autonomously navigate the ego vehicle system 210.

The ego vehicle system 210 includes a satellite antenna 215 coupled to the communication path 214 such that the communication path 214 communicatively couples the satellite antenna 215 to other modules of the ego vehicle system 210. The satellite antenna 215 is configured to receive signals from global positioning system satellites. In one embodiment, the satellite antenna 215 includes one or more conductive elements that interact with electromagnetic signals transmitted by global positioning system satellites. The received signal is transformed into a data signal indicative of the location (e.g., latitude and longitude) of the satellite antenna 215 or an object positioned near the satellite antenna 215, by one or more processors 212.

The ego vehicle system 210 includes one or more vehicle sensors 213. Each of one or more vehicle sensors 213 is coupled to the communication path 214 and communicatively coupled to one or more processors 212. One or more vehicle sensors 213 may include one or more motion sensors for detecting and measuring motion and changes in the motion of the ego vehicle system 210. The motion sensors may include inertial measurement units. Each of the one or more motion sensors may include one or more accelerometers and one or more gyroscopes. Each of one or more motion sensors transforms sensed physical movement of the vehicle into a signal indicative of an orientation, a rotation, a velocity, or an acceleration of the vehicle.

Still referring to FIG. 2, the ego vehicle system 210 includes a network interface hardware 217 for communicatively coupling the ego vehicle system 210 to the server 240. The network interface hardware 217 may be communicatively coupled to the communication path 214 and may be any device capable of transmitting and/or receiving data via a network. The network interface hardware 217 may include a communication transceiver for sending and/or receiving any wired or wireless communication. For example, the network interface hardware 217 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 217 includes hardware configured to operate in accordance with the Bluetooth® wireless communication protocol. The network interface hardware 217 of the ego vehicle system 210 may transmit its data to the server 240. For example, the network interface hardware 217 of the ego vehicle system 210 may transmit vehicle data, location data, maneuver data, and the like to the server 240.

The ego vehicle system 210 may connect with one or more external ego vehicle systems (e.g., the remote vehicle system 220) and/or external processing devices (e.g., a cloud server, an edge server, or both) via a direct connection. The direct connection may be a vehicle-to-vehicle connection ( ‖V2V connection‖), a vehicle-to-everything connection ( ▯V2X connection▯), or an mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure.

Vehicles may function as infrastructure nodes to form a mesh network and connect dynamically on an ad-hoc basis. In this way, vehicles may enter and/or leave the network at will, such that the mesh network may self-organize and self-modify over time. The network may include vehicles forming peer-to-peer networks with other vehicles or utilizing centralized networks that rely upon certain vehicles and/or infrastructure elements. The network may include networks using the centralized server and other central computing devices to store and/or relay information between vehicles.

Still referring to FIG. 2, the ego vehicle system 210 may be communicatively coupled to the remote vehicle system 220, the server 240, or both, by the network 270. In one embodiment, the network 270 may include one or more computer networks (e.g., a personal area network, a local area network, or a wide area network), cellular networks, satellite networks and/or a global positioning system and combinations thereof. The ego vehicle system 210 may be communicatively coupled to the network 270 via a wide area network, a local area network, a personal area network, a cellular network, a satellite network, etc. Suitable local area networks may include wired Ethernet and/or wireless technologies such as Wi-Fi. Suitable personal area networks may include wireless technologies such as IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the remote vehicle system 220 includes one or more processors 222, one or more memory modules 226, one or more sensors 228, one or more device sensors 223, a satellite antenna 225, a network interface hardware 227, and a communication path 224 communicatively connected to the other components of remote vehicle system 220. The components of the remote vehicle system 220 may be structurally similar to and have similar functions as the corresponding components of the ego vehicle system 210 (e.g., the one or more processors 222 correspond to the one or more processors 212, the one or more memory modules 226 correspond to the one or more memory modules 216, the one or more sensors 228 correspond to the one or more sensors 218, the satellite antenna 225 corresponds to the satellite antenna 215, the communication path 224 corresponds to the communication path 214, and the network interface hardware 227 corresponds to the network interface hardware 217).

Still referring to FIG. 2, the server 240 includes one or more processors 244, one or more memory modules 246, a network interface hardware 248, one or more vehicle sensors 249, and a communication path 242 communicatively connected to the other components of the ego vehicle system 210. The components of the server 240 may be structurally similar to and have similar functions as the corresponding components of the ego vehicle system 210 (e.g., the one or more processors 244 correspond to the one or more processors 212, the one or more memory modules 246 correspond to the one or more memory modules 216, the one or more vehicle sensors 249 correspond to the one or more vehicle sensors 213, the communication path 242 corresponds to the communication path 214, and the network interface hardware 248 corresponds to the network interface hardware 217). The one or more memory modules 246 store instructions, when executed by the one or more processors 244, that cause the one or more processors 244 to determine a degree of conflict in a conflict zone 130 (shown in FIG. 1A) between the ego vehicle 110 (shown in FIG. 1A) and the remote vehicle 120 (shown in FIG. 1A) based on a position and a velocity of the ego vehicle 110 (shown in FIG. 1A), and driving information of the remote vehicle 120 (shown in FIG. 1A), select a negotiation protocol based on the degree of conflict, and transmit the selected protocol to the ego vehicle such that the ego vehicle negotiates with the remote vehicle using the selected negotiation protocol.

It should be understood that the components illustrated in FIG. 2 are merely illustrative and are not intended to limit the scope of this disclosure. More specifically, while the components in FIG. 2 are illustrated as residing within the ego vehicle system 210 the remote vehicle system 220, or both, this is a non-limiting example. In some embodiments, one or more of the components may reside external to the ego vehicle system 210, the remote vehicle system 220, or both, such as with the server 240.

FIGS. 3A-3F schematically depict an exemplary embodiment of selecting a negotiation protocol for connected vehicles including lane exchanges on a road, according to one or more embodiments shown and described herein.

Figure 3A:
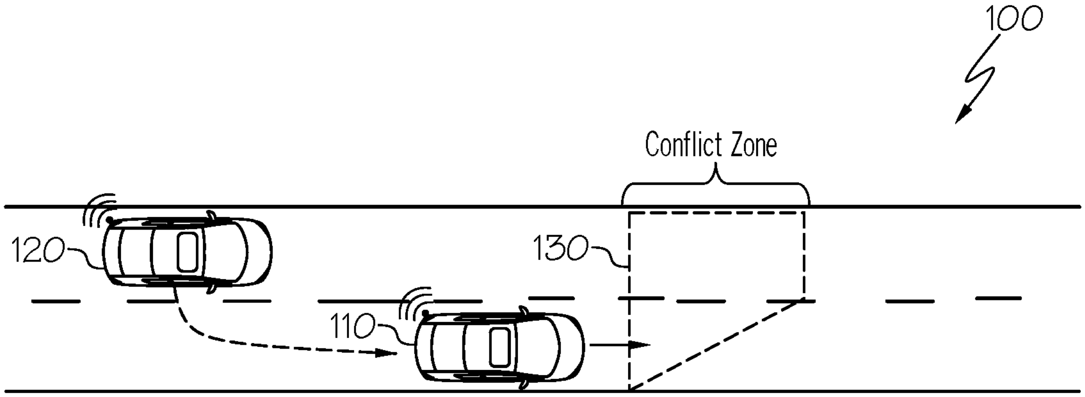
FIGS. 3A-3F schematically depict an exemplary embodiment of selecting a negotiation protocol for connected vehicles including lane exchanges on a road, according to one or more embodiments shown and described herein.

Referring to FIG. 3A, the ego vehicle 110, and the remote vehicle 120 may be on a road similar to FIG. 1A but the remote vehicle 120 has a closer initial position to the conflict zone 130 than in FIG. 1A. The remote vehicle 120 in FIG. 3A has an intention of driving more aggressively, such as changing lane frequently, high speed, or both. These driving information from the remote vehicle 120, the location of the ego vehicle 110, and the location of the remote vehicle 120 may make it harder for the ego vehicle 110 to merge ahead of the remote vehicle 120 without a conflict, compared to FIG. 1A.

Still referring to FIG. 3A, the ego vehicle 110 is planning to merge ahead of the remote vehicle 120. The remote vehicle 120 is approaching from an on-ramp. A conflict zone 130 is defined near the end of the ramp, where the ego vehicle 110 and the remote vehicle 120 should not appear inside at the same time to avoid undesired situation, such as collision.

Figure 3B:
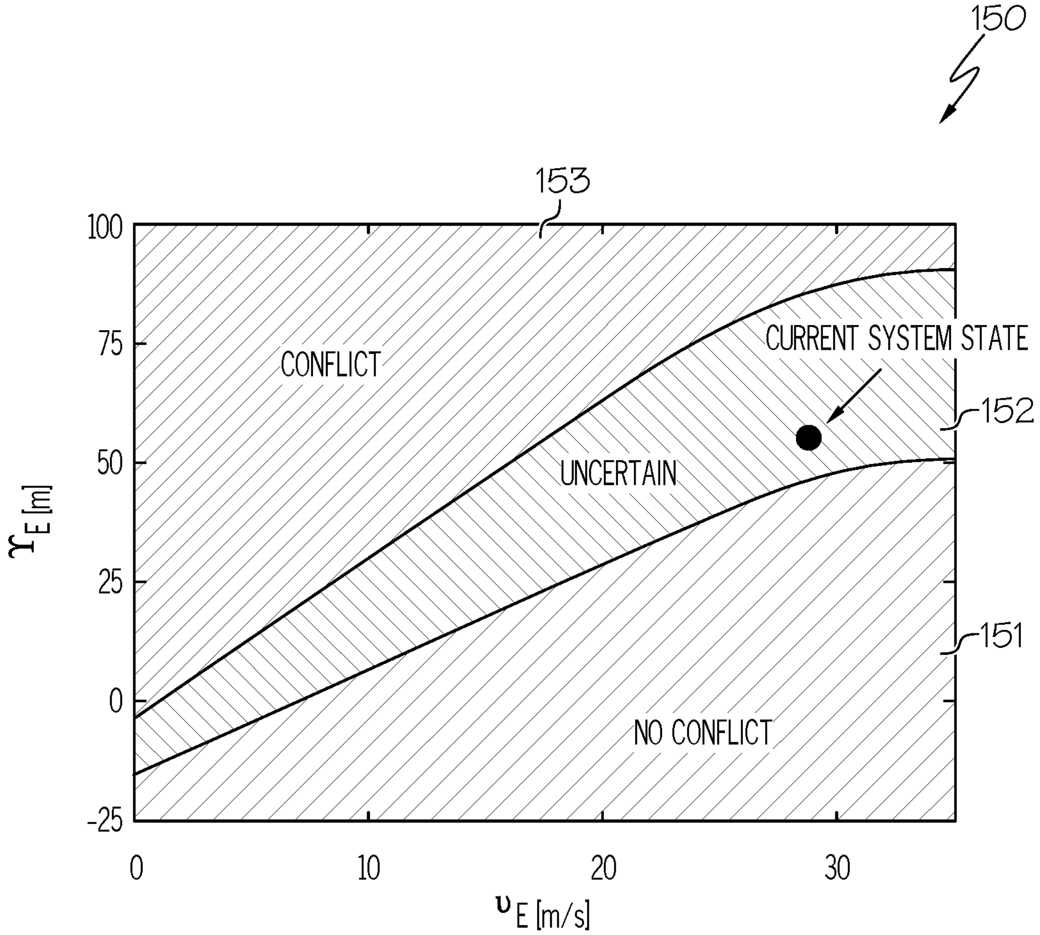

Referring to FIG. 3B, the ego vehicle 110 determines a degree of conflict in a conflict zone 130 based on a position and a velocity of the ego vehicle 110, expected velocity/accelerations of the ego vehicle 110 for the following few seconds and driving information of the remote vehicle 120. The ego vehicle 110 may determine the position of the state of the ego vehicle 110 is in the uncertain domain 152.

Figure 3C:
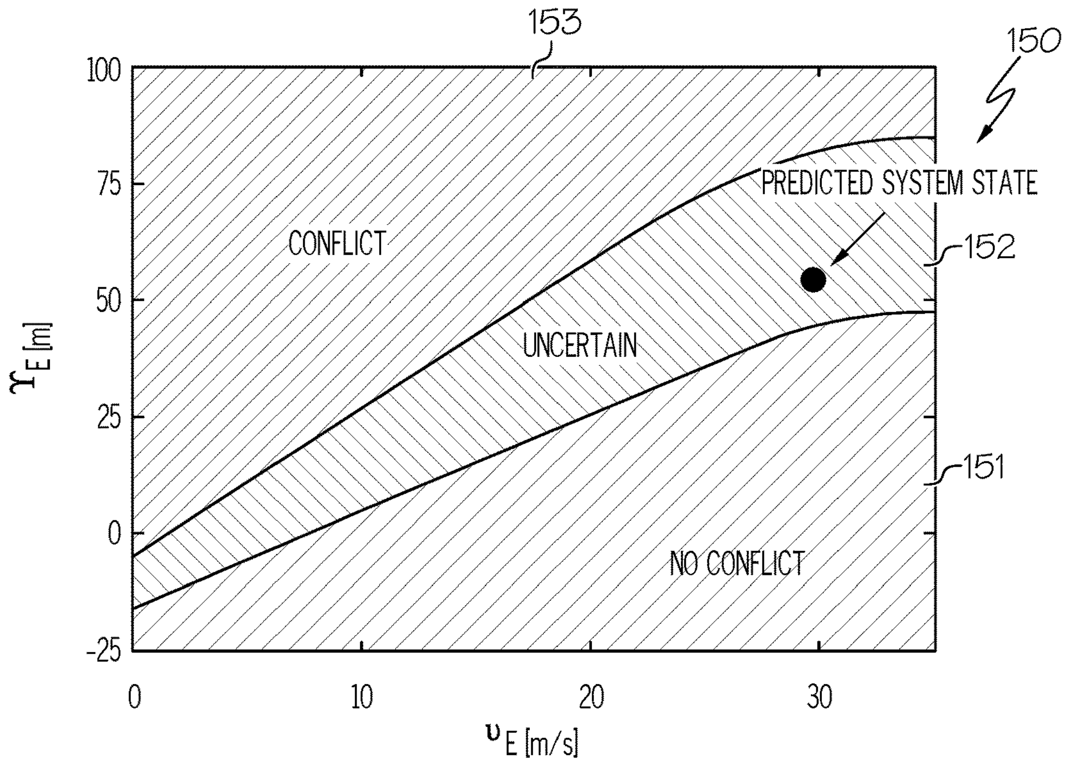
Figure 3D:
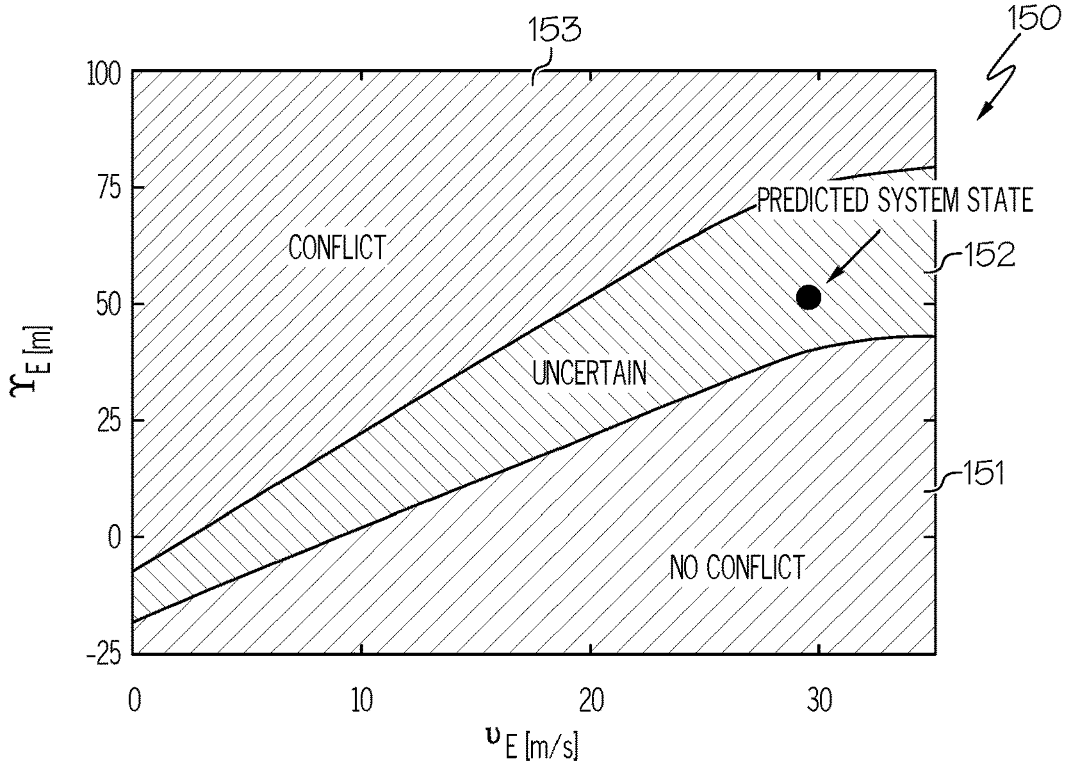
Figure 3E:
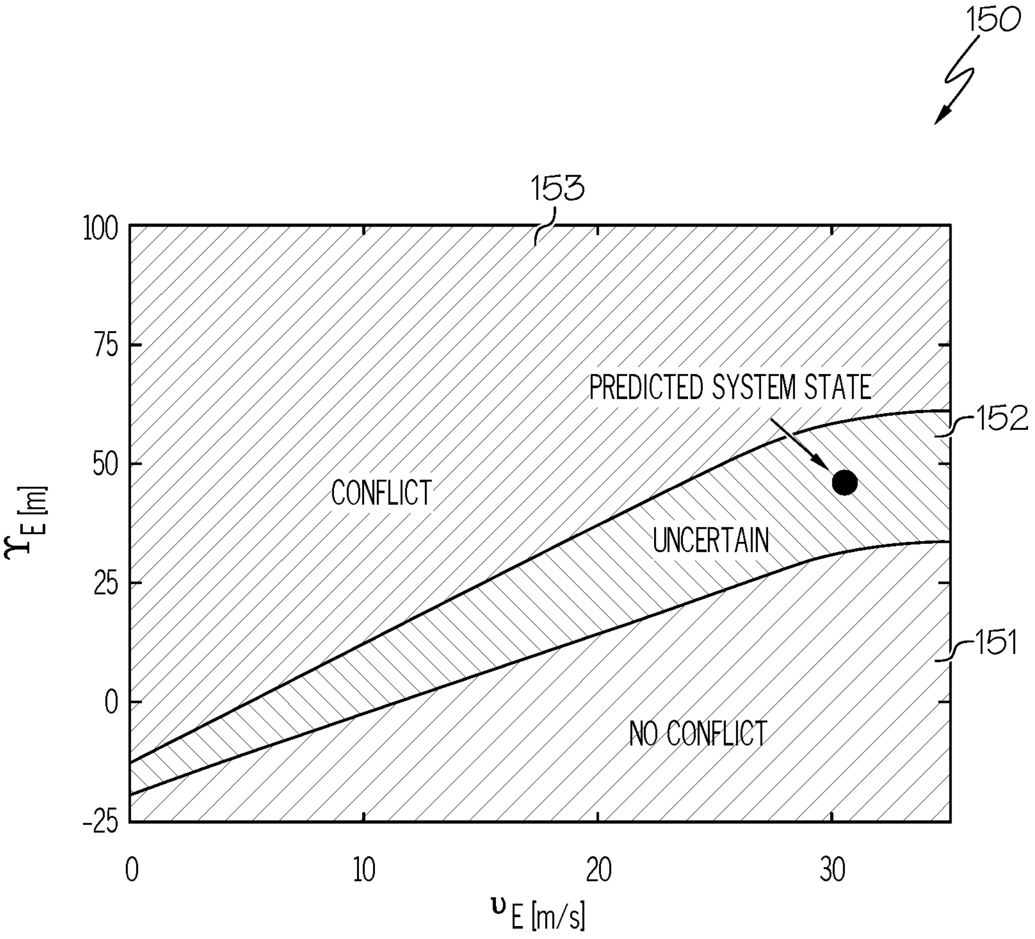

Referring to FIGS. 3C-3E, in response to determining that the position of the state of the ego vehicle 110 is in the uncertain domain 152, the ego vehicle 110 may predict a degree of conflict during a predetermine time period. In response to determining that the position of the state of the ego vehicle 110 is in the uncertain domain 152, the ego vehicle 110 may predict a sequence of the position of the state of the ego vehicle 110 in the conflict chart 150. The ego vehicle 110 may predict a sequence of the position of the state of the ego vehicle 110 in the conflict chart 150 charts for a set of discrete future times.

In some embodiments, the predetermined time period may be a time took to negotiate between the ego vehicle 110 and the remote vehicle 120. The ego vehicle 110 may predict a degree of conflict at a first time, at a second time, and at a third time. The second time and the third time may be later than the first time. The third time may be later than the second time.

Still referring to FIGS. 3C-3E, in response to determining that the position of the state of the ego vehicle 110 is in the uncertain domain 152, the ego vehicle 110 may generate conflict charts at one or more future times. For example, the ego vehicle 110 may generate conflict charts 150 at a first time, a second time, and a third time as shown in FIGS. 3C-3E respectively. The ego vehicle 110 may predict positions of the states of the ego vehicle 110 in the conflict charts 150 at one or more future times, such as at a first time, a second time, and a third time as shown in FIGS. 3C-3E respectively.

Referring to FIG. 3C, the ego vehicle 110 may predict the position of the state of the ego vehicle 110 is in the uncertain domain 152 at the first time based on the position and the velocity of the ego vehicle 110, and driving information of the remote vehicle 120. Referring to FIG. 3D, the ego vehicle 110 may predict the position of the state of the ego vehicle 110 is in the uncertain domain 152 at the second time based on the position and the velocity of the ego vehicle 110, and driving information of the remote vehicle 120. Referring to FIG. 3E, the ego vehicle 110 may predict the position of the state of the ego vehicle 110 is in the uncertain domain 152 at the third time based on the position and the velocity of the ego vehicle 110, and driving information of the remote vehicle 120.

Figure 3F:
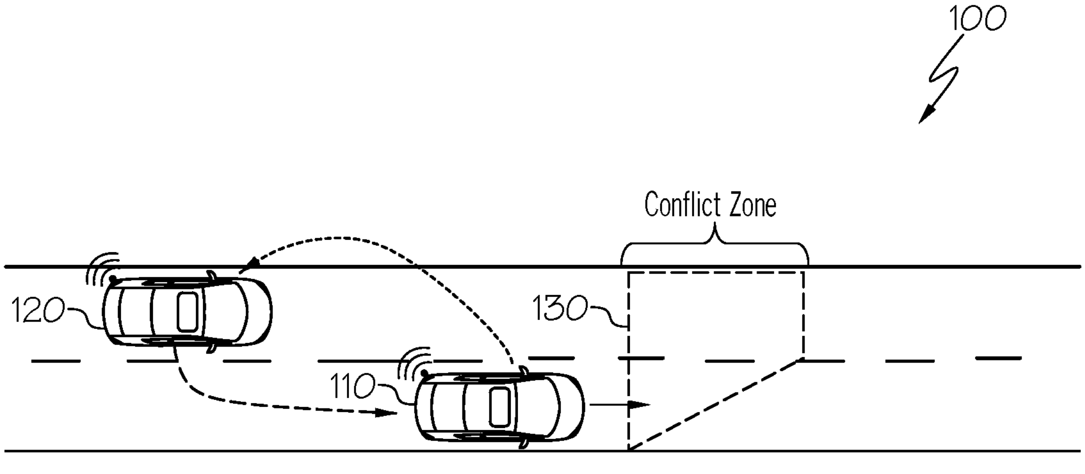

Referring to FIG. 3F, the ego vehicle 110 may select the negotiation protocol based on the predicted degree of conflict during the predetermined time period, for example, including the first time, the second time, and the third time. Still referring to FIG. 3F, the ego vehicle 110 may select the negotiation protocol based on the predicted positions at one or more future times, such as at the first time, the second time, and the third time as shown in FIGS. 3C-3E respectively. Referring to FIG. 3F, in response to determining that the position of the state of the ego vehicle 110 is in the conflict chart 150 and predicting that the position of the state of the ego vehicle 110 is in the conflict chart 150 during a predetermine time period including the first time, the second time, and the third time, the ego vehicle 110 may select a negotiation protocol based on the degree of conflict and initiate a negotiation with the remote vehicle 120 based on the selected negotiation protocol. In embodiments, the ego vehicle 110 may select the basic negotiation protocol in response to determining that none of the predicted positions, such as shown in FIG. 3C-3E, is in the conflict domain 153. For example, in response to determining that the position of the state of the ego vehicle 110 is in the uncertain domain 152 and predicting that the position of the state of the ego vehicle 110 is in the uncertain domain 152 during a predetermine time period including the first time, the second time, and the third time, the ego vehicle 110 may select a basic negotiation protocol. Specifically, if the position of the state of the ego vehicle 110 is predicted to be in the uncertain domain 152 at a certain time during the predetermined time period, such as the third time, the ego vehicle 110 may determine that the conflict between the ego vehicle 110 and the remote vehicle 120 may not become inevitable. Specifically, the ego vehicle 110 may negotiate with the remote vehicle 120 during the predetermined time period to avoid a potential conflict. Thus, the ego vehicle 110 may select a basic negotiation protocol, rather than an emergency negotiation protocol.

Still referring to FIG. 3F, the ego vehicle 110 may initiate a negotiation, such as a basic negotiation, with the remote vehicle 120 based on the selected negotiation protocol, the basic negotiation protocol. The ego vehicle 110 may operate based on negotiation, such as a basic negotiation. The ego vehicle 110 and the remote vehicle 120 may operate based on the basic negotiation, respectively. The ego vehicle 110 may merge ahead of the remote vehicle 120, while the remote vehicle 120 keeps driving in the same lane without significantly changing the velocity, the acceleration, the direction, or combinations thereof, without an undesired situation.

FIGS. 4A-4F schematically depict an exemplary embodiment of selecting a negotiation protocol for connected vehicles including lane exchanges on a road, according to one or more embodiments shown and described herein.

Figure 4A:
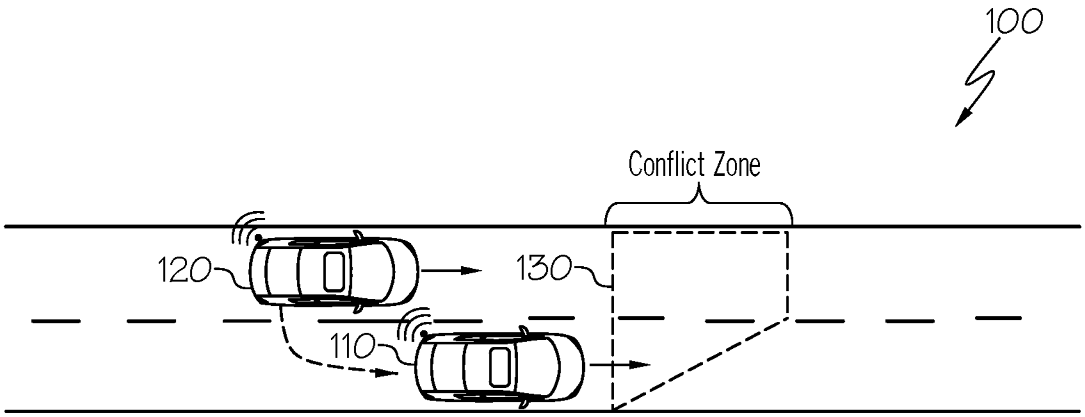
FIGS. 4A-4F schematically depict an exemplary embodiment of selecting a negotiation protocol for connected vehicles including lane exchanges on a road, according to one or more embodiments shown and described herein.

Referring to FIG. 4A, the ego vehicle 110, and the remote vehicle 120 may be on a road similar to FIG. 3A but the ego vehicle 110 and the remote vehicle 120 has a closer initial position to the conflict zone 130 than in FIG. 3A. The remote vehicle 120 in FIG. 4A has an intention of driving similar to FIG. 3A. These driving information from the remote vehicle 120, the location of the ego vehicle 110, and the location of the remote vehicle 120 may make it harder for the ego vehicle 110 to merge ahead of the remote vehicle 120 without a conflict, compared to FIG. 3A.

Still referring to FIG. 4A, the ego vehicle 110 is planning to merge ahead of the remote vehicle 120. The remote vehicle 120 is approaching from an on-ramp. The conflict zone 130 is defined near the end of the ramp, where the ego vehicle 110 and the remote vehicle 120 should not appear inside at the same time to avoid undesired situation, such as collision.

Figure 4B:
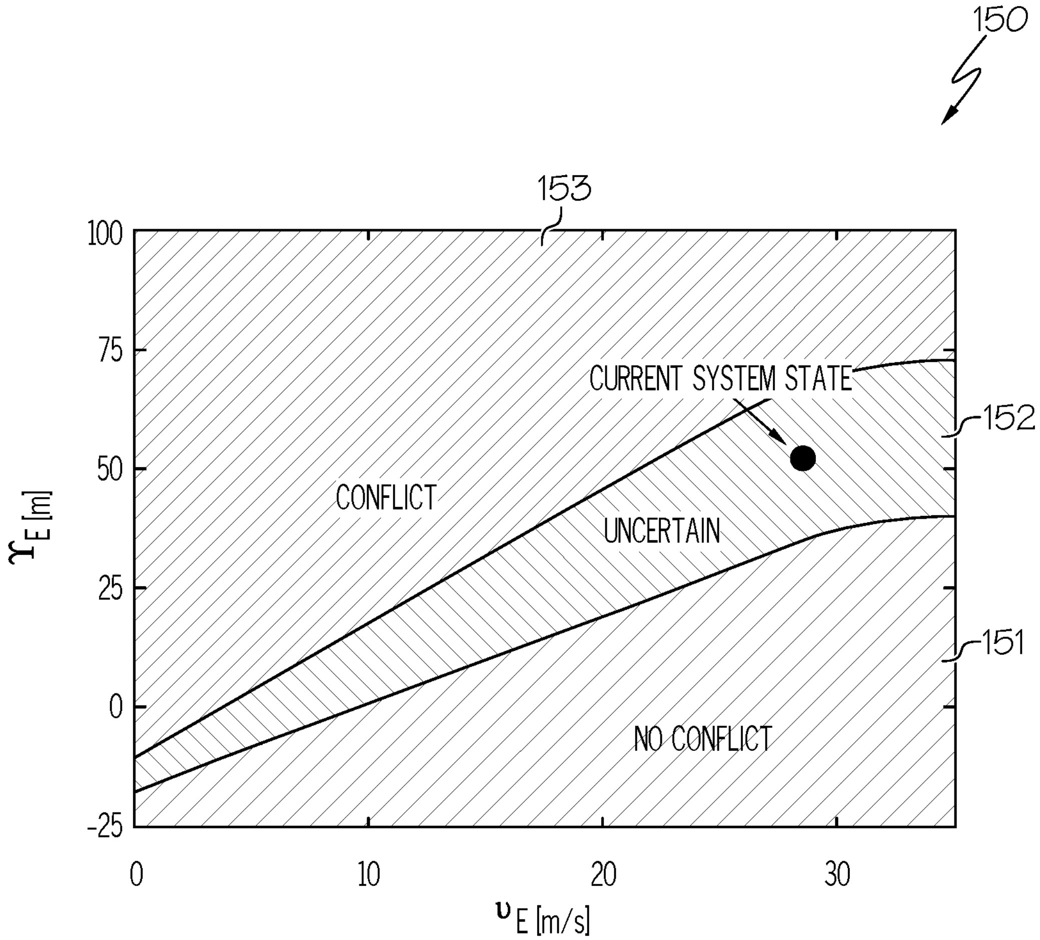

Referring to FIG. 4B, the ego vehicle 110 determines a degree of conflict in a conflict zone 130 based on a position and a velocity of the ego vehicle 110, and driving information of the remote vehicle 120. The ego vehicle 110 may determine the position of the state of the ego vehicle 110 is in the uncertain domain 152.

Figure 4C:
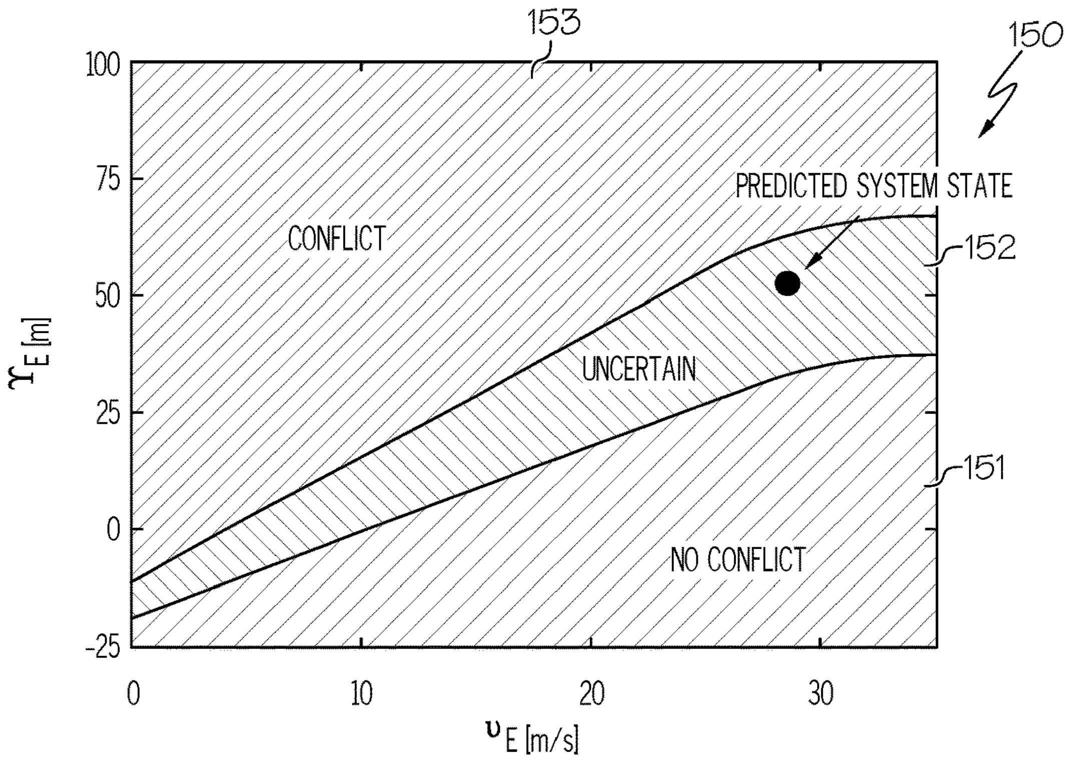
Figure 4D:
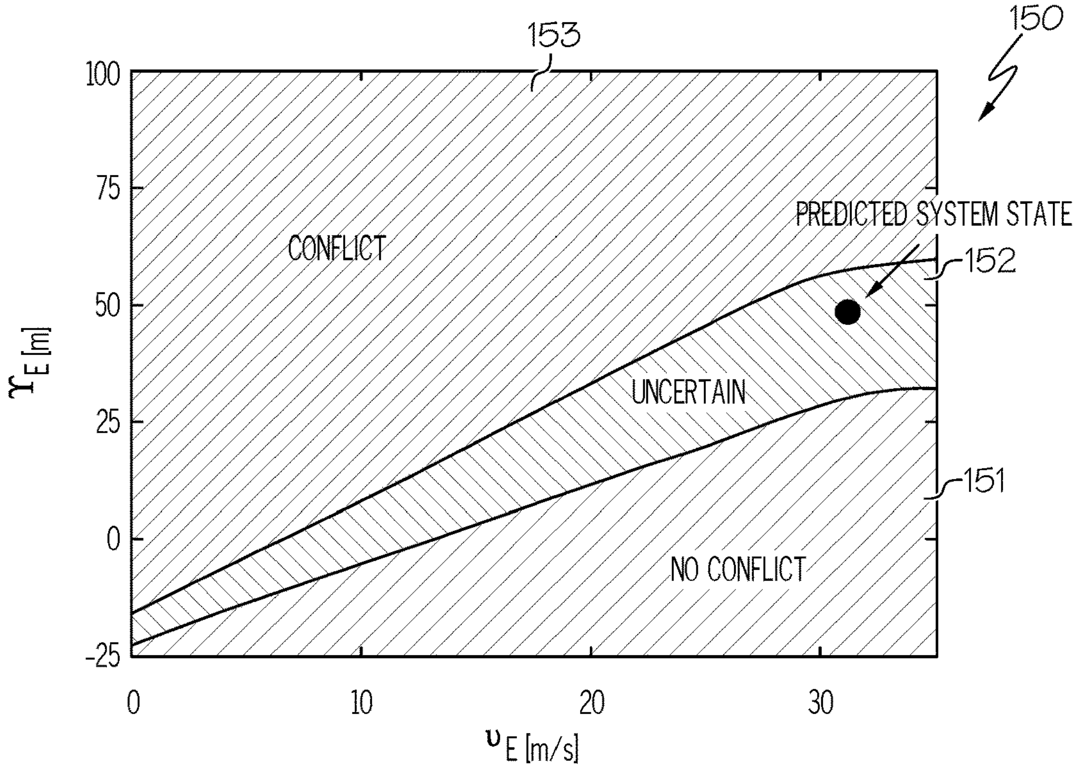
Figure 4E:
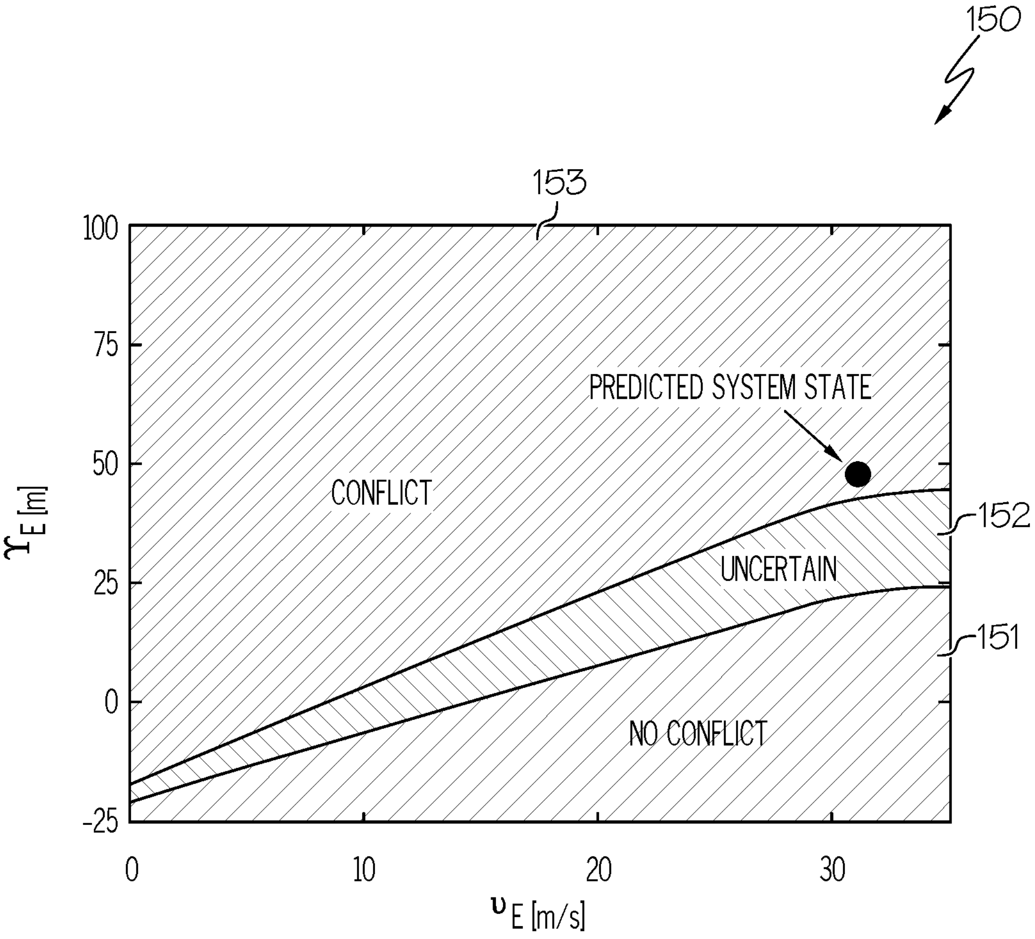

Referring to FIGS. 4C-4E, in response to determining that the position of the state of the ego vehicle 110 is in the uncertain domain 152, the ego vehicle 110 may predict a degree of conflict during a predetermine time period. Still referring to FIGS. 4C-4E, in response to determining that the position of the state of the ego vehicle 110 is in the uncertain domain 152, the ego vehicle 110 may generate conflict charts at one or more future times. For example, the ego vehicle 110 may generate conflict charts 150 at a first time, a second time, and a third time as shown in FIGS. 4C-4E respectively. The ego vehicle 110 may predict positions of the states of the ego vehicle 110 in the conflict charts 150 at one or more future times, such as at the first time, the second time, and the third time as shown in FIGS. 4C-4E respectively.

Referring to FIG. 4C, the ego vehicle 110 may predict the position of the state of the ego vehicle 110 is in the uncertain domain 152 at the first time based on the position and the velocity of the ego vehicle 110, and driving information of the remote vehicle 120. Referring to FIG. 4D, the ego vehicle 110 may predict the position of the state of the ego vehicle 110 is in the uncertain domain 152 at the second time based on the position and the velocity of the ego vehicle 110, and driving information of the remote vehicle 120. Referring to FIG. 4E, the ego vehicle 110 may predict the position of the state of the ego vehicle 110 is in the conflict domain 153 at the third time based on the position and the velocity of the ego vehicle 110, and driving information of the remote vehicle 120.

The ego vehicle 110 may select the emergency negotiation protocol in response to determining that any of the predicted positions is in the conflict domain 153, such as shown in FIG. 4C-4E. For example, referring to FIG. 4F, in response to determining that the position of the state of the ego vehicle 110 is in the uncertain domain 152, predicting that the position of the state of the ego vehicle 110 is in the uncertain domain 152 at the first time and the second time, and predicting that the position of the state of the ego vehicle 110 is in the conflict domain 153 at the third time, the ego vehicle 110 may select an emergency negotiation protocol. In response to predicting that the position of the state of the ego vehicle 110 is in the uncertain domain 152 at the first time and the second time and predicting that the position of the state of the ego vehicle 110 is in the conflict domain 153 at the third time, the ego vehicle 110 may determine that the conflict between the ego vehicle 110 and the remote vehicle 120 will become inevitable at the third time if the remote vehicle 120 maintains the current driving information, such as, the lane, the velocity, or both. Thus, the ego vehicle 110 may select an emergency negotiation protocol, rather than a basic negotiation protocol.

Figure 4F:
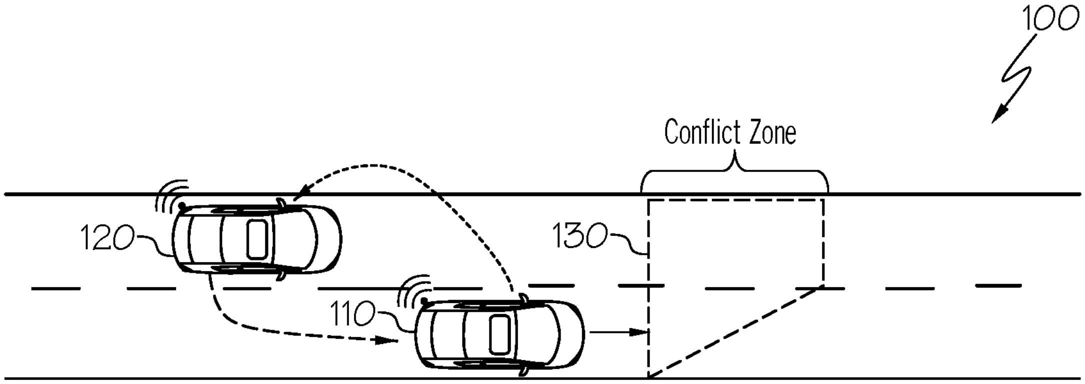

Still referring to FIG. 4F, the ego vehicle 110 may initiate a negotiation, such as an emergency negotiation, with the remote vehicle 120 based on the selected negotiation protocol, the emergency negotiation protocol. The ego vehicle 110 may operate based on negotiation, such as an emergency negotiation. The ego vehicle 110 and the remote vehicle 120 may operate based on an emergency negotiation respectively. The ego vehicle 110 may merge ahead of the remote vehicle 120 and ask the remote vehicle 120 to change the lane, change a velocity (such as reduce a velocity), change an acceleration (such as reduce an acceleration), or combinations thereof, to avoid an undesired situation.

Figure 5A:
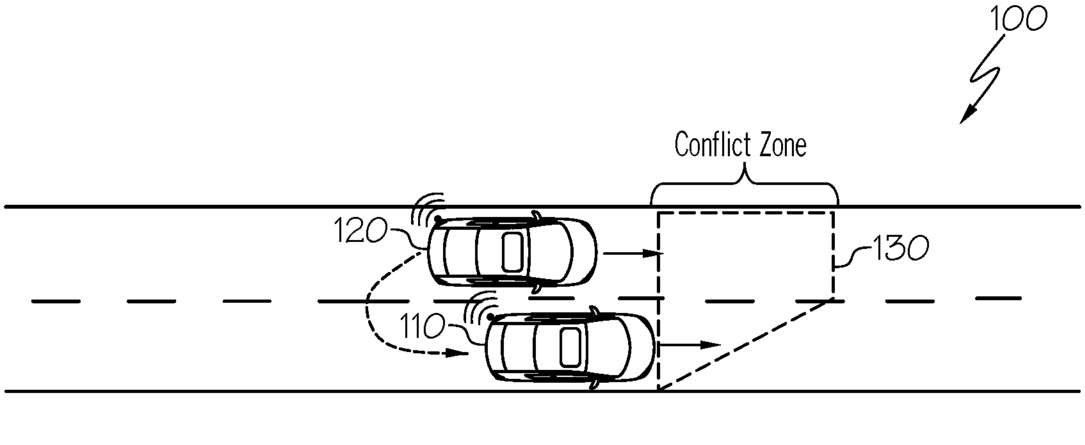
FIGS. 5A-5C schematically depict an exemplary embodiment of selecting a negotiation protocol for connected vehicles including lane exchanges on a road, according to one or more embodiments shown and described herein.
Figure 5B:
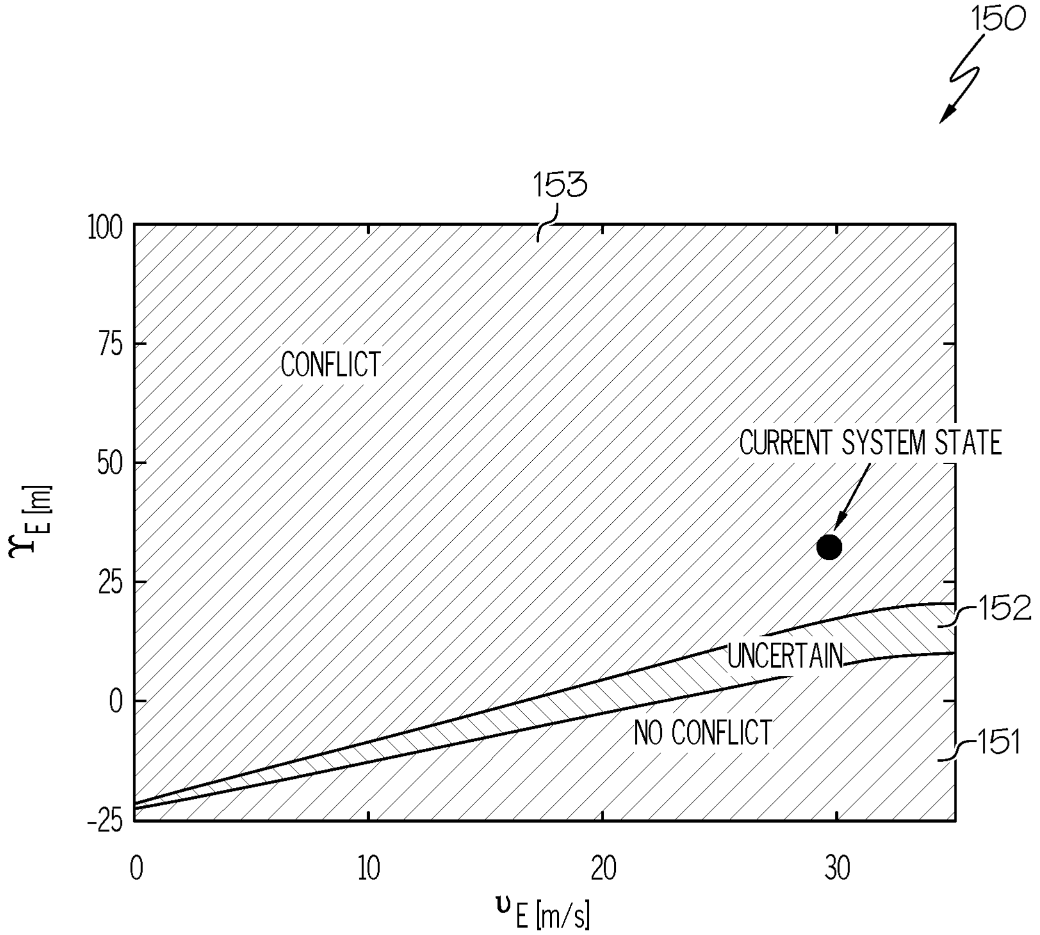
Figure 5C:
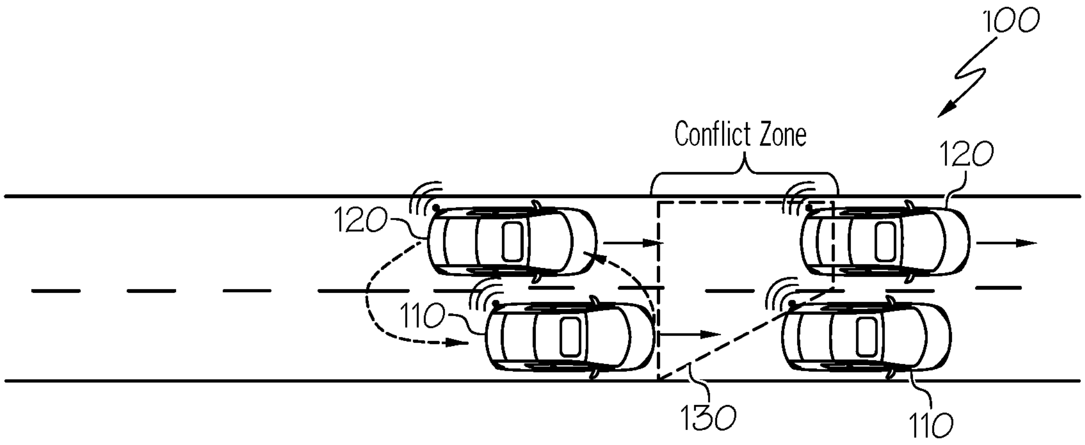

FIGS. 5A-5C schematically depict an exemplary embodiment of selecting a negotiation protocol for connected vehicles including lane exchanges on a road, according to one or more embodiments shown and described herein.

Referring to FIG. 5A, the ego vehicle 110, and the remote vehicle 120 may be on a road similar to FIG. 4A but the ego vehicle 110 and the remote vehicle 120 are significantly closer to the conflict zone 130 than in FIG. 4A. The remote vehicle 120 in FIG. 5A has an intention of driving similar to FIG. 4A. These driving information from the remote vehicle 120, the location of the ego vehicle 110, and the location of the remote vehicle 120 may make it harder for the ego vehicle 110 to merge ahead of the remote vehicle 120 without a conflict, compared to FIG. 4A.

Still referring to FIG. 5A, the ego vehicle 110 is planning to merge ahead of the remote vehicle 120. The remote vehicle 120 is approaching from an on-ramp. A conflict zone 130 is defined near the end of the ramp, where the ego vehicle 110 and the remote vehicle 120 should not appear inside at the same time to avoid undesired situation, such as collision.

Referring to FIG. 5B, the ego vehicle 110 determines a degree of conflict in a conflict zone 130 based on a position and a velocity of the ego vehicle 110, and driving information of the remote vehicle 120. The ego vehicle 110 may determine the position of the state of the ego vehicle 110 is in the conflict domain 153.

Referring to FIG. 5C, in response to determining that the position of the state of the ego vehicle 110 is in the conflict domain 153, the ego vehicle 110 may select an emergency negotiation protocol. In response to determining that the position of the state of the ego vehicle 110 is in the conflict domain 153, the ego vehicle 110 may determine that the conflict between the ego vehicle 110 and the remote vehicle 120 will become inevitable at the third time if the remote vehicle 120 maintains the current driving information, such as, the lane, the velocity, or both. Thus, the ego vehicle 110 may select an emergency negotiation protocol, rather than a basic negotiation protocol.

Still referring to FIG. 5C, the ego vehicle 110 may initiate a negotiation, such as an emergency negotiation, with the remote vehicle 120 based on the selected negotiation protocol, the emergency negotiation protocol. The ego vehicle 110 may operate based on negotiation, such as an emergency negotiation. The ego vehicle 110 and the remote vehicle 120 may operate based on the emergency negotiation respectively. The ego vehicle 110 may start an emergency negotiation to ask the remote vehicle 120 to clear the conflict zone 130 as soon as possible, and in the meantime perform minimum risk maneuver to avoid conflict with the remote vehicle 120 by applying emergency brake. The minimum risk maneuver may involve getting in conflict with the remote vehicle 120 but would minimize the severity of the conflict, such as brake hard or pull over instead of colliding with the remote vehicle 120.

Figure 6:
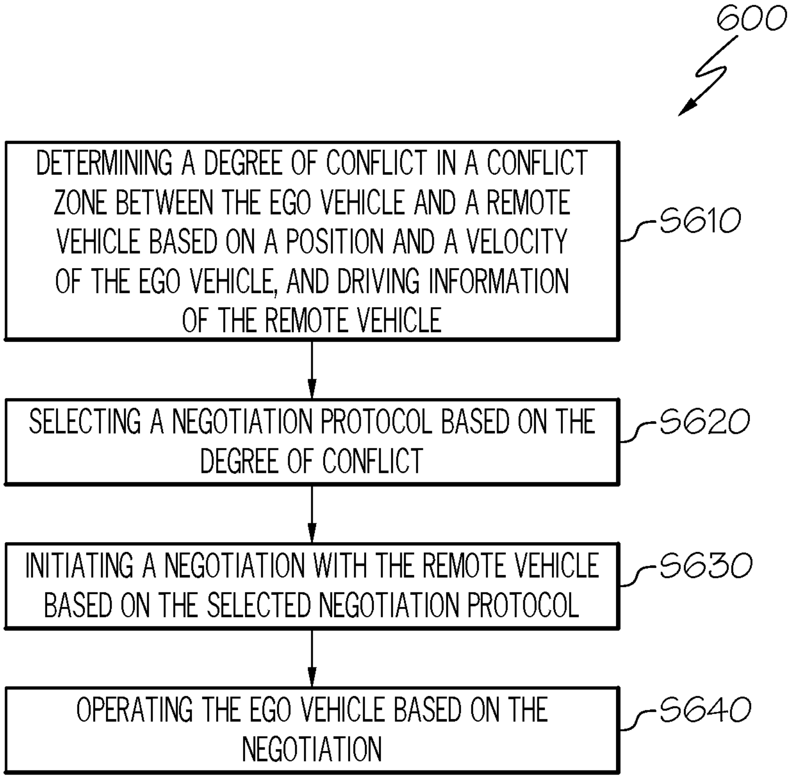
FIG. 6 depicts a flowchart for a method of selecting a negotiation protocol for connected vehicles, according to one or more embodiments shown and described herein.

FIG. 6 depicts a flowchart for a method of selecting a negotiation protocol for connected vehicles, according to one or more embodiments shown and described herein. The method 600 may be executed by the system 100 as depicted in FIGS. 1A-1C as described herein. Additionally, the method 600 will be described with reference to the elements depicted in FIGS. 2-5C.

Referring to FIGS. 1A-1C, 2 and 6, at step S610, a controller, for example, the controller of the ego vehicle 110, the controller of the server 240, or both, may determine a degree of conflict in the conflict zone 130 between the ego vehicle 110 and the remote vehicle 120 based on the position and the velocity of the ego vehicle 110, and driving information of the remote vehicle 120. For example, referring to FIG. 1B, the controller may determine the position of the state of the ego vehicle 110 is in the no-conflict domain 151. As another example, referring to FIG. 3B, the controller may determine the position of the state of the ego vehicle 110 is in the uncertain domain 152. As another example, referring to FIG. 4B, the controller may determine the position of the state of the ego vehicle 110 is in the uncertain domain 152. As another example, referring to FIG. 5B, the controller may determine the position of the state of the ego vehicle 110 is in the conflict domain 153.

In embodiments, in response to determining that the position of the state of the ego vehicle 110 is in the uncertain domain 152, the controller may predict a degree of conflict during a predetermine time period. For example, referring to FIG. 3C, the controller may predict the position of the state of the ego vehicle 110 is in the uncertain domain 152 at a first time. Referring to FIG. 3D, the controller may predict the position of the state of the ego vehicle 110 is in the uncertain domain 152 at a second time. Referring to FIG. 3E, the controller may predict the position of the state of the ego vehicle 110 is in the uncertain domain 152 at a third time. For example, referring to FIG. 4C, the controller may predict the position of the state of the ego vehicle 110 is in the uncertain domain 152 at a first time. Referring to FIG. 4D, the controller may predict the position of the state of the ego vehicle 110 is in the uncertain domain 152 at a second time. Referring to FIG. 4E, the controller may predict the position of the state of the ego vehicle 110 is in the conflict domain 153 at a third time.

Referring back to FIGS. 1A-1C, 2 and 6, at step S620, the controller may select a negotiation protocol based on the degree of conflict. For example, referring to FIG. 1C, in response to determining that the position of the state of the ego vehicle 110 is in the no-conflict domain 151, the controller may hold selecting a negotiation protocol. As another example, referring to FIG. 3F, in response to determining that the position of the state of the ego vehicle 110 is in the uncertain domain 152 and predicting that the position of the state of the ego vehicle 110 is in the uncertain domain 152 during a predetermine time period, such as the first time, the second time, and the third time, the controller may select a basic negotiation protocol. As another example, referring to FIG. 4F, in response to determining that the position of the state of the ego vehicle 110 is in the uncertain domain 152, predicting that the position of the state of the ego vehicle 110 is in the uncertain domain 152 at the first time and the second time, and predicting that the position of the state of the ego vehicle 110 is in the conflict domain 153 at the third time, the controller may select an emergency negotiation protocol. As another example, referring to FIG. 5C, in response to determining that the position of the state of the ego vehicle 110 is in the conflict domain 153, the controller may select an emergency negotiation protocol.

Referring back to FIGS. 1A-1C, 2 and 6, at step S630, the controller may initiate a negotiation with the remote vehicle 120 based on the selected negotiation protocol. For example, referring to FIG. 1C, in response to determining that the position of the state of the ego vehicle 110 is in the no conflict domain 153, the controller may hold initiating the negotiation with the remote vehicle 120. As another example, referring to FIG. 3F, the controller may initiate a basic negotiation, with the remote vehicle 120 based on the basic negotiation protocol. As another example, referring to FIG. 4F, the controller may initiate an emergency negotiation, with the remote vehicle 120 based on the emergency negotiation protocol. As another example, referring to FIG. 5C, the controller may initiate an emergency negotiation, with the remote vehicle 120 based on the emergency negotiation protocol.

Referring back to FIGS. 1A-1C, 2 and 6, at step S640, the controller may operate the ego vehicle 110 based on the negotiation. For example, referring to FIG. 3F, the controller may operate the ego vehicle 110 based on negotiation, such as a basic negotiation. The ego vehicle 110 and the remote vehicle 120 may operate based on the basic negotiation respectively. The ego vehicle 110 may merge ahead of the remote vehicle 120, while the remote vehicle 120 keeps driving in the same lane without significantly changing the velocity, the acceleration, or the direction, or combinations thereof, without an undesired situation. For example, referring to FIG. 4F, the controller may operate the ego vehicle 110 based on negotiation, such as an emergency negotiation. The ego vehicle 110 and the remote vehicle 120 may operate based on the emergency negotiation respectively. The ego vehicle 110 may merge ahead of the remote vehicle 120 and ask the remote vehicle 120 to change the lane, change a velocity (such as reduce a velocity), change an acceleration (such as reduce an acceleration), or combinations thereof, to avoid an undesired situation. For example, referring to FIG.

5C, the controller may operate the ego vehicle 110 based on negotiation, such as an emergency negotiation. The ego vehicle 110 and the remote vehicle 120 may operate based on an emergency negotiation respectively. The ego vehicle 110 may start an emergency negotiation to ask the remote vehicle 120 to clear the conflict zone 130 as soon as possible, and in the meantime perform minimum risk maneuver to avoid conflict with the remote vehicle 120 by applying emergency brake. The minimum risk maneuver may involve getting in conflict with the remote vehicle 120 but would minimize the severity of the conflict, such as brake hard or pull over instead of colliding with the remote vehicle 120.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. An ego vehicle comprising:

a controller configured to:

determine a degree of conflict in a conflict zone between the ego vehicle and a remote vehicle based on a position and a velocity of the ego vehicle, and driving information of the remote vehicle, wherein the remote vehicle is communicatively coupled to the ego vehicle;

select a negotiation protocol based on the degree of conflict, the negotiation protocol comprising one of a basic negotiation protocol or an emergency negotiation protocol;

initiate a negotiation with the remote vehicle based on the selected negotiation protocol, wherein the negotiation comprises communication between the ego vehicle and the remote vehicle to perform vehicle maneuvers, wherein the negotiation according to the emergency negotiation protocol comprises the ego vehicle sending a message to the remote vehicle that a particular section of road will be reserved or to clear the conflict zone; and operate the ego vehicle based on the negotiation to perform a minimum risk maneuver to avoid or reduce conflict with the remote vehicle, the minimum risk maneuver comprising applying an emergency brake or pulling over.

2. The ego vehicle according to claim 1, wherein the controller is further configured to:

generate a conflict chart comprising a no-conflict domain, an uncertain domain, and a conflict domain based on the position and the velocity of the ego vehicle and the driving information of the remote vehicle;

determine the degree of conflict based on a position of a state of the ego vehicle in the conflict chart, the state of the ego vehicle comprising the position and the velocity of the ego vehicle; and initiate a negotiation request based on the negotiation protocol.

3. The ego vehicle according to claim 2, wherein in response to determining that the position of the state of the ego vehicle is in the no conflict domain, the controller is further configured to hold selecting the negotiation protocol and hold initiating the negotiation.

4. The ego vehicle according to claim 2, wherein in response to determining that the position of the state of the ego vehicle is in the uncertain domain, the controller is further configured to select a basic negotiation protocol or an emergency negotiation protocol.

5. The ego vehicle according to claim 2, wherein in response to determining that the position of the state of the ego vehicle is in the conflict domain, the controller is further configured to select an emergency negotiation protocol.

6. The ego vehicle according to claim 4, wherein in response to determining that the position of the state of the ego vehicle is in the uncertain domain, the controller is further configured to:

predict a degree of conflict during a predetermine time period; and select the negotiation protocol based on the predicted degree of conflict during the predetermined time period.

7. The ego vehicle according to claim 6, wherein the predetermined time period is a time took to negotiate between the ego vehicle and the remote vehicle.

8. The ego vehicle according to claim 2, wherein in response to determining that the position of the state of the ego vehicle is in the uncertain domain, the controller is further configured to:

generate conflict charts at one or more future times;

predict positions of the states of the ego vehicle in the conflict charts at one or more future times; and select the negotiation protocol based on the predicted positions at one or more future times.

9. The ego vehicle according to claim 8, wherein the controller is further configured to:

select a basic negotiation protocol in response to determining that none of the predicted positions is in the conflict domain.

10. The ego vehicle according to claim 8, wherein the controller is further configured to:

select an emergency negotiation protocol in response to determining that any of the predicted positions is in the conflict.

11. The ego vehicle according to claim 1, wherein the position of the ego vehicle is a distance from the conflict zone to the ego vehicle.

12. A method for selecting a negotiation protocol, the method comprising:

determining a degree of conflict in a conflict zone between an ego vehicle and a remote vehicle based on a position and a velocity of the ego vehicle, and driving information of the remote vehicle, wherein the remote vehicle is communicatively coupled to the ego vehicle;

selecting, by the ego vehicle, a negotiation protocol based on the degree of conflict, the negotiation protocol comprising one of a basic negotiation protocol or an emergency negotiation protocol;

initiating a negotiation with the remote vehicle based on the selected negotiation protocol, wherein the negotiation comprises communication between the ego vehicle and the remote vehicle to perform vehicle maneuvers, wherein the negotiation according to the emergency negotiation protocol comprises the ego vehicle sending a message to the remote vehicle that a particular section of road will be reserved or to clear the conflict zone; and operating the ego vehicle based on the negotiation to perform a minimum risk maneuver to avoid or reduce conflict with the remote vehicle, the minimum risk maneuver comprising applying an emergency brake or pulling over.

13. The method according to claim 12, further comprising:

generating a conflict chart comprising a no-conflict domain, an uncertain domain, and a conflict domain based on the position and the velocity of the ego vehicle and the driving information of the remote vehicle;

determining the degree of conflict based on a position of a state of the ego vehicle in the conflict chart, the state of the ego vehicle comprising the position and the velocity of the ego vehicle; and initiating a negotiation request based on the negotiation protocol.

14. The method according to claim 13, further comprising:

in response to determining that the position of the state of the ego vehicle is in the no conflict domain, holding selecting the negotiation protocol and holding initiating the negotiation.

15. The method according to claim 13, further comprising:

in response to determining that the position of the state of the ego vehicle is in the uncertain domain, selecting a basic negotiation protocol or an emergency negotiation protocol.

16. The method according to claim 13, further comprising:

in response to determining that the position of the state of the ego vehicle is in the conflict domain, selecting an emergency negotiation protocol.

17. The method according to claim 15, further comprising:

in response to determining that the position of the state of the ego vehicle is in the uncertain domain:

predicting a degree of conflict during a predetermine time period; and selecting the negotiation protocol based on the predicted degree of conflict during the predetermined time period.

18. The method according to claim 17, wherein the predetermined time period is a time took to negotiate between the ego vehicle and the remote vehicle.

19. The method according to claim 13, further comprising:

in response to determining that the position of the state of the ego vehicle is in the uncertain domain:

generating conflict charts at one or more future times;

predicting positions of the states of the ego vehicle in the conflict charts at one or more future times; and selecting the negotiation protocol based on the predicted positions at one or more future times.

20. The method according to claim 19, further comprising:

selecting a basic negotiation protocol in response to determining that none of the predicted positions is in the conflict domain.

* * * * *